(12) United States Patent
Heidtmann et al.

(10) Patent No.: US 10,933,968 B2
(45) Date of Patent: Mar. 2, 2021

(54) MONUMENT ARRANGEMENT IN A CABIN OF A VEHICLE, A CABIN OF A VEHICLE AS WELL AS A VEHICLE HAVING SUCH A CABIN

(71) Applicant: AIRBUS OPERATIONS GMBH, Hamburg (DE)

(72) Inventors: Andreas Heidtmann, Hamburg (DE); René Waldheuer, Hamburg (DE)

(73) Assignee: Airbus Operations GmbH

( * ) Notice: Subject to any disclaimer, the term of this patent is extended or adjusted under 35 U.S.C. 154(b) by 351 days.

(21) Appl. No.: 15/991,940

(22) Filed: May 29, 2018

(65) Prior Publication Data

US 2018/0346090 A1    Dec. 6, 2018

(30) Foreign Application Priority Data

May 31, 2017   (DE) .................. 10 2017 111 913

(51) Int. Cl.
*B64C 1/14*       (2006.01)
*B64D 11/04*      (2006.01)
(Continued)

(52) U.S. Cl.
CPC ............ *B64C 1/1407* (2013.01); *B64D 11/02* (2013.01); *B64D 11/04* (2013.01); *B64D 2011/0046* (2013.01)

(58) Field of Classification Search
CPC ....... B64C 1/1407; B64D 11/02; B64D 11/04; B64D 2011/0046
(Continued)

(56) References Cited

U.S. PATENT DOCUMENTS 9,016,626 B2 *   4/2015   Schliwa ................. B61D 35/00
                                                        244/118.5
2009/0065641 A1  3/2009   Koehn et al.
(Continued)

FOREIGN PATENT DOCUMENTS

DE   102011011704 A1   12/2012
DE   102014110808 A1    2/2016
(Continued)

OTHER PUBLICATIONS

German Search Report for Application No. 102017111913.2, dated Apr. 11, 2018, 8 pages (p. 2 categorizing the cited references).

*Primary Examiner* — Claude J Brown
(74) *Attorney, Agent, or Firm* — Lerner, David, Littenberg, Krumholz & Mentlik, LLP

(57) ABSTRACT

A monument arrangement for a cabin of a vehicle has a first monument, with a washroom formed therein, a second monument and an aisle. The first and second monuments enclose the aisle, wherein an access opening to the washroom is directed toward a side wall of the second monument and is adjacent to the aisle. The distance between the access opening and the relevant side wall of the second monument is at most 1 m, and the side wall of the second monument has a first, rigid side wall portion and at least one second side-wall portion, which is mounted on the first side wall portion such that it can be pivoted about a vertical axis and which can be pivoted from a neutral position, running in the direction toward the first side wall portion, into an angled position, directed away from the first monument and the aisle.

13 Claims, 3 Drawing Sheets

(51) Int. Cl.
*B64D 11/02* (2006.01)
*B64D 11/00* (2006.01)

(58) Field of Classification Search
USPC ..................................................... 244/118.5
See application file for complete search history.

(56) References Cited

U.S. PATENT DOCUMENTS

| | | | |
|---|---|---|---|
| 2010/0059625 A1* | 3/2010 | Saint-Jalmes | B64C 1/1469 244/118.6 |
| 2012/0261509 A1* | 10/2012 | Grant | B64D 11/02 244/118.5 |
| 2014/0097294 A1 | 4/2014 | Boren et al. | |
| 2014/0175219 A1* | 6/2014 | Young | B64D 11/02 244/118.5 |
| 2016/0009396 A1* | 1/2016 | Seibt | A47K 17/02 244/118.5 |
| 2017/0137131 A1* | 5/2017 | Seibt | B64D 11/02 |

FOREIGN PATENT DOCUMENTS

| | | |
|---|---|---|
| DE | 102015116804 A1 | 4/2017 |
| EP | 2815974 A1 | 12/2014 |
| WO | 2011101385 A2 | 8/2011 |

\* cited by examiner

MONUMENT ARRANGEMENT IN A CABIN OF A VEHICLE, A CABIN OF A VEHICLE AS WELL AS A VEHICLE HAVING SUCH A CABIN

TECHNICAL FIELD

The disclosed embodiments of the invention relate to a monument arrangement in a cabin of a vehicle, to a cabin of a vehicle as well as to a vehicle having such a cabin.

BACKGROUND

Passenger transporting vehicles are often equipped with washrooms arranged at a front end or a rear end of a passenger-seating region. In order to ensure that the installation space available is utilized as efficiently as possible, the sizes of various items in a washroom are limited, and it is often also the case that widths of an aisle adjacent to a washroom are limited to a pronounced extent. This relates, in particular, to the use thereof in passenger aircraft.

It is known for two washrooms to be arranged one beside the other in an aircraft and for a wall located therebetween to be removed, or swung away, in order to produce a washroom which is enlarged overall. Said washroom can be entered by passengers in a wheelchair. In order to enlarge access openings of a washroom, it is also known, alongside a door, for a pivotable flap to be arranged on the access opening, it being possible for said flap to be selectively swung away in order therefore to provide an enlarged access opening.

In order for a person with reduced mobility to reach a washroom, provision may also be made for a wheelchair to be advanced up to the washroom in order then for the user to enter into the washroom via a separate seat along the edge of the access opening, moving his legs into the washroom from there. However, the constricted layout of a passenger cabin means that it is fairly difficult, if not impossible to enter into an individual washroom of which the access opening is located on a narrow aisle which, in addition, is restricted by a further cabin monument on a directly opposite side.

Patent document DE 10 2014 110 808 A1 discloses, for example, a washroom which is intended for an aircraft and has a first wall, with an access opening arranged therein, a door and an elongate flap. The door is arranged on the first wall such that it can be pivoted relative to the access opening about a first axis of rotation, and it adjoins the flap, which is arranged parallel to the first axis of rotation, on an access opening side located opposite the first axis of rotation, such that it can be pivoted along a second axis of rotation. The door and the elongate flap, in a closed state, extend from the first axis of rotation and second axis of rotation to the second axis of rotation and first axis of rotation, respectively, and together close the access opening completely.

Patent document WO 2011 101 385 A2 also discloses a toilet arrangement which is intended for a means of transport and has a first toilet area, a second toilet area, which is adjacent to the first, and a partition wall, which is located between the first toilet area and the second toilet area, wherein the partition wall is mounted in a movable manner and is intended to be moved into an open position in which there is no separation between the first toilet area and the second toilet area. This allows two relatively small toilet areas to be converted into a larger toilet area, which is suitable for use by persons with reduced mobility.

BRIEF SUMMARY

It is an object of the disclosure to make it possible for a wheelchair passenger to access a washroom conveniently, even when an access opening to the relevant washroom is located on an aisle which does not provide sufficient turning radius for a wheelchair.

The object is achieved by a monument arrangement having the features of independent claim 1. Advantageous embodiments and developments can be gathered from the dependent claims and the description which follows.

The disclosure proposes a monument arrangement for a cabin of a vehicle, and in particular of an aircraft, having a first monument, with a washroom formed therein, a second monument and an aisle, wherein the first monument and the second monument enclose the aisle between them, wherein an access opening to the washroom in the first monument is directed toward a side wall which belongs to the second monument and is adjacent to the aisle, wherein the distance between the access opening of the washroom and the relevant side wall of the second monument is at most 1 m, and wherein the side wall of the second monument has a first, rigid side wall portion and at least one second side-wall portion, which is mounted on the first side wall portion such that it can be pivoted about a vertical axis and which can be pivoted from a neutral position, running in the direction toward the first side wall portion, into an angled position, directed away from the first monument and the aisle.

The second, pivotable portion of the side wall can, if required, increase the available space directly in front of the access opening to the washroom of the first monument in order to provide for movement of a wheelchair. The compact arrangement with a clear distance between the washroom opening and the opposite side wall of the second monument of at most 1 m can otherwise render movement in a wheelchair very difficult, not to say impossible. If the washroom opening is arranged, for example, transversely to a main extent axis of the relevant aisle, the passenger in the wheelchair has to alter his direction of travel by for example 90° as he enters the washroom. At the same time, a door which closes the access opening has to be opened. Overall, this would compromise the comfort of a passenger with reduced mobility.

However, this can be improved to a considerable extent, if required, as a result of that side wall of the second monument which is directed toward the access opening being subdivided. Pivoting the second, pivotably mounted side wall portion into an angled position, directed away from the first monument, can considerably increase the radius of action directly in front of the access opening. The clear distance to the access opening is enlarged, at least in part, and this makes it easier for the wheelchair to alter direction. Depending on the width of the aisle and on the size of the second side wall portion, it may also be possible from time to time for there to be sufficient space for an additional helper for pushing the wheelchair.

Consequently, if use is made of such a configuration, an existing washroom of tried and tested design can continue to be used and need not be modified to the extent where an enlarged access opening or the like is provided. It is a considerably more straightforward task to subdivide a side wall of the second monument, depending on the design of the latter.

In an advantageous embodiment, the second monument may be a kitchen monument, which has at least one storage location for a serving trolley, wherein the at least one storage location directly adjoins the relevant side wall on a side which is directed away from the first monument. Such a configuration of the second monument is particularly advantageous because a storage location for mobile serving trolleys which is directly adjacent to the side wall can be readily released by the removal of a serving trolley, in order then for the second side wall portion to be moved into the envisaged angled position.

It may be recommended for at least one stowage compartment to be provided above the trolley storage locations, at least in a region directed toward the side wall, it being possible for said stowage compartment to be emptied when the pivotable portion of the side wall is being used or pivoted. For this purpose, relevant stowage compartments could be provided, for example, with boxes or the like which can readily be removed and stored temporarily at some other location.

As an alternative to this, it is also possible for the relevant region to be taken up by a work surface which has no installations of note located above it.

In a preferred embodiment, the at least one storage location is delimited in the upward direction by a work surface which has a swing mounted work surface portion, which is directed toward the second side wall portion and can be swung, as required, between a use position and a release position, wherein the second side wall portion can be pivoted only in the release position of the work surface portion. The use position can be interpreted as a position which allows conventional use of the swing mounted work surface portion, where the work surface is in a planar state throughout. In the release position, the swing mounted work surface portion is swung away preferably about a horizontal pivot axis, and therefore the second side wall portion can be pivoted into an area otherwise occupied by the work surface. The swing action work surface portion can also function as a locking means, it being possible for the second, pivotable side wall portion to remain exclusively in its neutral position.

It may be recommended for the second side wall portion to have a pivoting action restrictor, which is intended to prevent the second side wall portion from pivoting closer to the first monument than the neutral position. This can be achieved in different ways, for example by an appropriate hinge fitting or additional devices, in particular by a stop arranged at an upper end. In particular and in combination with the swing action work surface portion explained above, locking in the neutral position can take place by virtue of the work surface portion being swung into a use position and by way of the pivoting action restrictor of the second side-wall portion.

In a further advantageous embodiment, the height of the pivotably mounted portion of the side wall is at most 1.8 m. Installations located above, for example when the second monument is a kitchen monument, can remain at the customary site of installation. The height restriction means that the particular advantage of the radius of action being enlarged if required can be utilized directly in front of the access opening of the washroom without there being any undue need for articles to be removed from the second monument. Nevertheless, help can be provided, in particular in a means of transport, by female flight attendants, whose height is often below 1.80 m.

In an advantageous embodiment, at least one stowage compartment is arranged above the at least one storage location, wherein there is a depth direction offset between a stowage compartment front and a storage location front. This means that the at least one storage location has a greater overall depth than the at least one stowage compartment located above. Consequently, the depth direction offset can be suitable to provide for a sufficient amount of pivoting space for the second side wall portion, without there being any need for the at least one stowage compartment to be emptied.

The second side wall portion preferably has a width which corresponds to the depth direction offset. This makes it possible for the entire depth direction offset to be used in order to pivot the second side wall portion.

In a likewise advantageous embodiment, the second side wall portion can be arrested in its neutral position. This makes it possible to ensure a particularly operationally reliable design of the second monument, in the case of which the relevant side wall, in a neutral position of the pivotably mounted portion, behaves mechanically in precisely the same way as an otherwise completely rigid side wall. It is possible, for this purpose, to use locking means, which fix the second side wall portion in the relevant directions in space. This can be done at one or more fastening regions of the second side wall portion. It is recommended to render the locking means easily accessible from the outside, in which case they can be easily disengaged, and arrested again, as required. It is recommended, in particular, to arrange the locking means at a lower end and/or an upper end of the pivotably mounted portion, said locking means being able to establish locking with the floor of the cabin and/or with a side wall portion located above.

In an advantageous embodiment, the pivotable portion of the side wall extends along the main extent direction of the aisle by the same distance as a door which closes the access opening. It is thus possible for the radius of action to be enlarged to a sufficient extent in front of the access opening. This is only possible, however, when the second monument allows such a second side wall portion.

It may be advantageous if a pivot axis of the pivotably mounted portion of the side wall is arranged directly opposite a door which closes the access opening. Consequently, the door and the pivotable portion can be pivoted in the same direction, which is particularly advantageous for the width of the access to the access opening.

The side wall of the second monument may be configured such that an outer edge which belongs to the second monument and projects into the cabin is formed by a vertical edge which belongs to the pivotable portion and is directed away from the pivot axis. This means that that width of the second monument which is formed in the direction of the cabin is reduced in size when the pivotably mounted portion is pivoted.

Furthermore, in order to provide a screened area in front of the access opening of the washroom, it is possible for a privacy screen element to extend as required from the first monument, via the aisle, to the second side wall portion. This means that screened off area is formed as required, and allows a helper to help a person in the wheelchair to enter or leave the washroom. The privacy screen element can be realized in the form of an additional flap on the first monument, in the form of the door or by a partition curtain or the like.

The disclosure also relates to a cabin for a vehicle, in particular for an aircraft. A monument arrangement as explained above is formed here. In an advantageous embodiment, the monument arrangement is adjacent to a cabin door region in which is integrated an access door through which passengers can enter or leave the vehicle.

The disclosure further relates to an aircraft having such a cabin. In an advantageous embodiment, as seen in the longitudinal direction of the aircraft, the monument arrangement is arranged in front of a door region and in front of at least one cabin portion with seats located therein. As an alternative, or in addition, it is possible for the monument arrangement to be located behind a rear door region, which is formed behind at least one cabin portion in which passenger seats are arranged.

BRIEF DESCRIPTION OF THE FIGURES

Further features, advantages and possible applications of the present disclosure can be gathered from the following description of the exemplary embodiments and from the figures. All the features described and/or illustrated here, individually and in any desired combination, form the subject matter of the disclosure even independently of their composition in the individual claims or the dependency references thereof. Furthermore, in the figures, like reference signs denote like or similar objects.

DETAILED DESCRIPTION OF EXEMPLARY EMBODIMENTS

Figure 1:
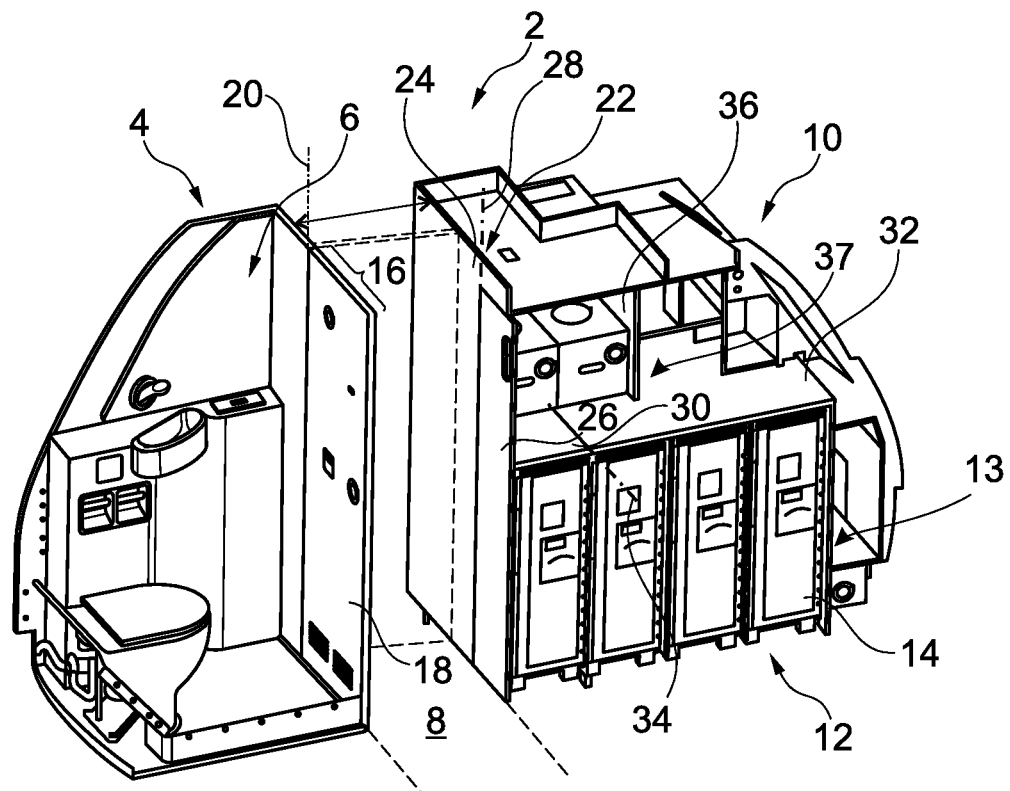
FIG. 1 shows a three dimensional view, partly in section, of a monument arrangement with a closed washroom and a second side wall portion in a neutral position.

FIG. 1 shows a monument arrangement 2 in a cabin of a vehicle designed, by way of example, in the form of an aircraft. The figure here shows a first monument 4, which has a washroom 6 and is laterally adjacent to an aisle 8. A second monument 10 is adjacent to an opposite side of the aisle 8 and has, in particular, a plurality of storage locations 12 for serving trolleys 14, i.e. a plurality of trolley storage locations. In this example, the second monument 10 is designed in the form of a kitchen monument. The first monument 4 and the second monument 10 enclose at least the visible part of the aisle 8 between them.

The washroom 6 has an access opening 16, which can be closed by a washroom door 18. As seen in the plane of the drawing, the washroom door 18 is mounted in a pivotable manner at a left hand, rear end, wherein a pivot axis 20 is indicated by dash dotted lines. A side wall 22 of the second monument 10 is located opposite the access opening 16, said side wall comprising a first, rigid side wall portion 24 and a second, pivotably mounted side wall portion 26. The second side wall portion 26 is mounted in a pivotable manner via a pivot axis 28, which runs perpendicularly to a floor, in other words a vertical axis 28.

Above the trolley storage locations 12, the second monument 10 has a work surface 32, which in turn has a swing action work surface portion 30, which is mounted for swing action via a horizontal pivot axis 34. As a result, the swing action work surface portion 30 can be moved from a use position, in which it is flush with the rest of the work surface 32 and covers over a trolley-storage location 12 adjacent to the second side wall portion 26, into a swung away position.

Also located above the trolley storage locations 12 are a plurality of stowage compartments 36, in which a variety of objects can be accommodated. By way of example, the figure here illustrates a stowage compartment front 37, i.e. a front of the stowage compartments 36, with a considerable depth direction offset corresponding to the width of the second portion 26 of the side wall 22. Consequently, the second side wall portion 26 can be pivoted about the pivot axis 28 onto the stowage compartment front 37 when the relevant serving trolley 14 alongside the pivotable portion 26 has been removed and the swing action work-surface portion 30 has been swung away. The width of the second side wall portion 26, then, corresponds to the depth direction offset between the stowage compartment front 37 and a storage location front 13, i.e. a front of the storage locations 12.

As illustrated schematically by an opening of the door 18, it is possible for the distance between the access opening 16 and the side wall 22 to be relatively small and to be considerably below 1 m, for example 80 cm or less.

Figure 2:
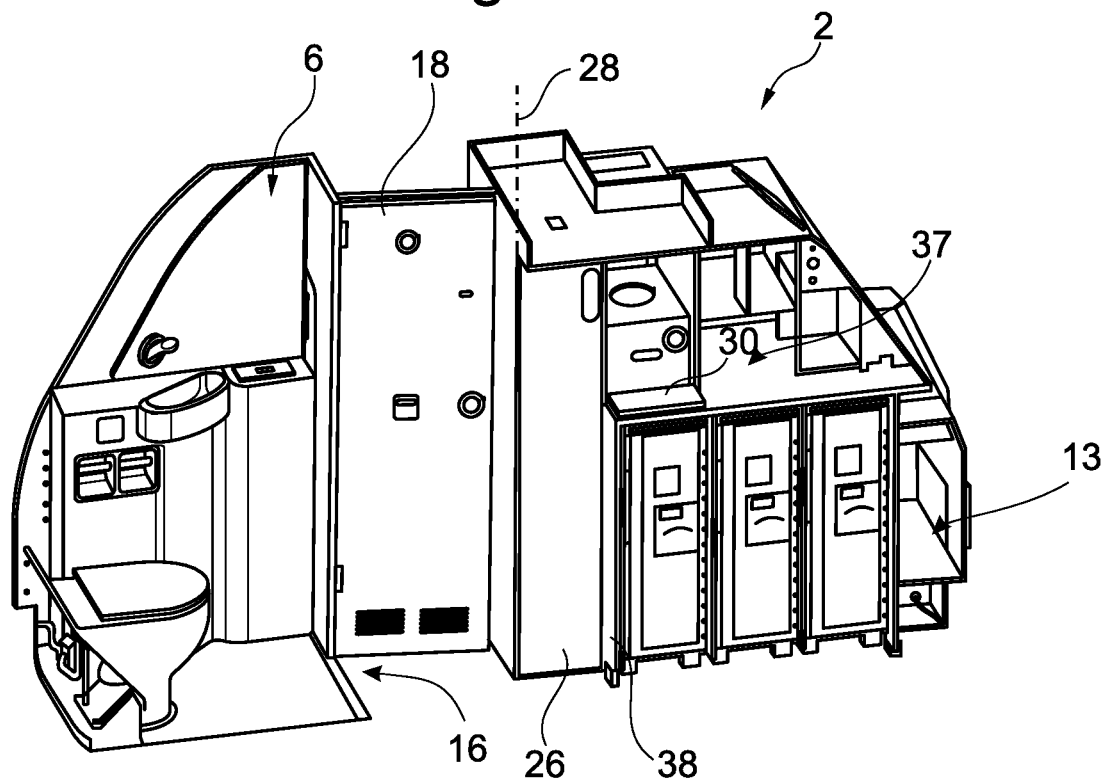
FIG. 2 shows a three dimensional view, partly in section, of the monument arrangement with an open washroom and a second side wall portion in a swung away position.

FIG. 2 shows the monument arrangement 2 with the second side wall portion 26 swung away from the first monument 4 about the relevant pivot axis 28. For this purpose, a serving trolley 14 has been removed from the relevant storage location 12, which is directly adjacent to the side wall 22. It can be seen here that, for this purpose, an additional side wall 38 is provided in order to section off this one trolley storage location 12. If, therefore, the pivotable portion 26 is swung away, the remaining trolley storage locations 12 are fully sectioned off in the outward direction.

In addition, the swing action work surface portion 30 has been swung through essentially 180°, about its pivot axis 34, onto the remaining, rigid part of the work surface 32 above the trolley storage locations 12 directed away from the side wall 22. Since the second side wall portion 26 has a depth direction extent which corresponds to the depth direction offset between a front side of the trolley storage locations 12 and a front side of the stowage compartments 36, said second side wall portion, then, is in flush abutment against the front side of the stowage compartments 36.

Figure 3:
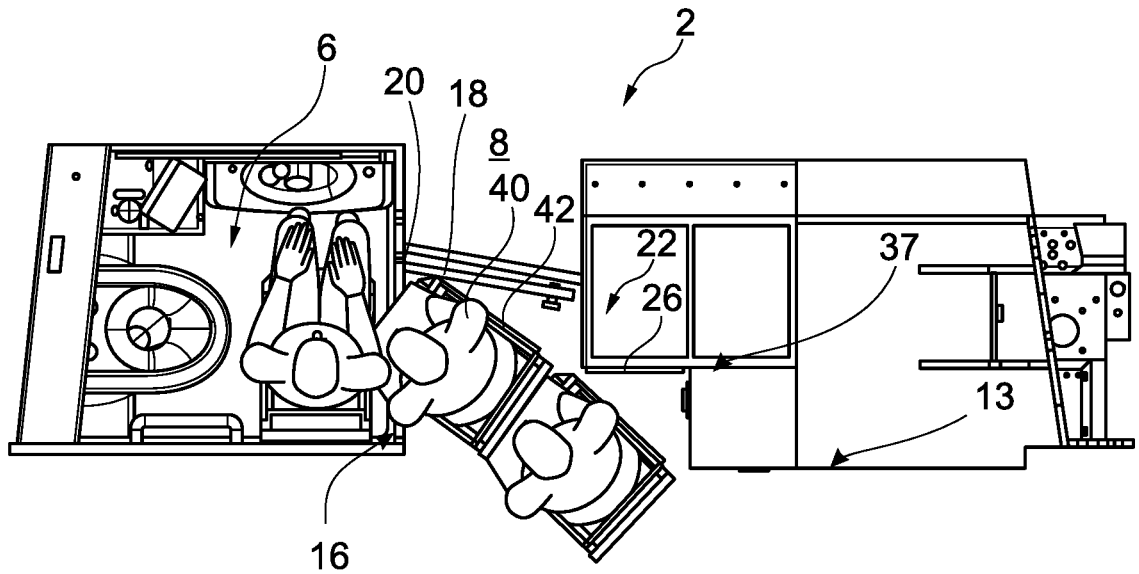
FIG. 3 shows a plan view of the monument arrangement with an open washroom and a second side-wall portion in a swung away position, wherein a passenger in a wheelchair is entering the washroom.

In this illustration, the washroom door 18 is open and a passenger in a wheelchair can easily enter into the washroom 6 as a result of the aisle 8 being enlarged on account of the pivotable portion 26 having been swung away. This is illustrated in a plan view in FIG. 3. FIG. 3 shows a passenger 40 in a wheelchair 42, which has a considerably improved radius of action as a result of the portion 26 of the side wall 22 having been swung away and, despite the narrowness of the aisle 8, can very comfortably enter into the washroom 6 by way of the access opening 16, which runs parallel to the aisle.

Figure 4:
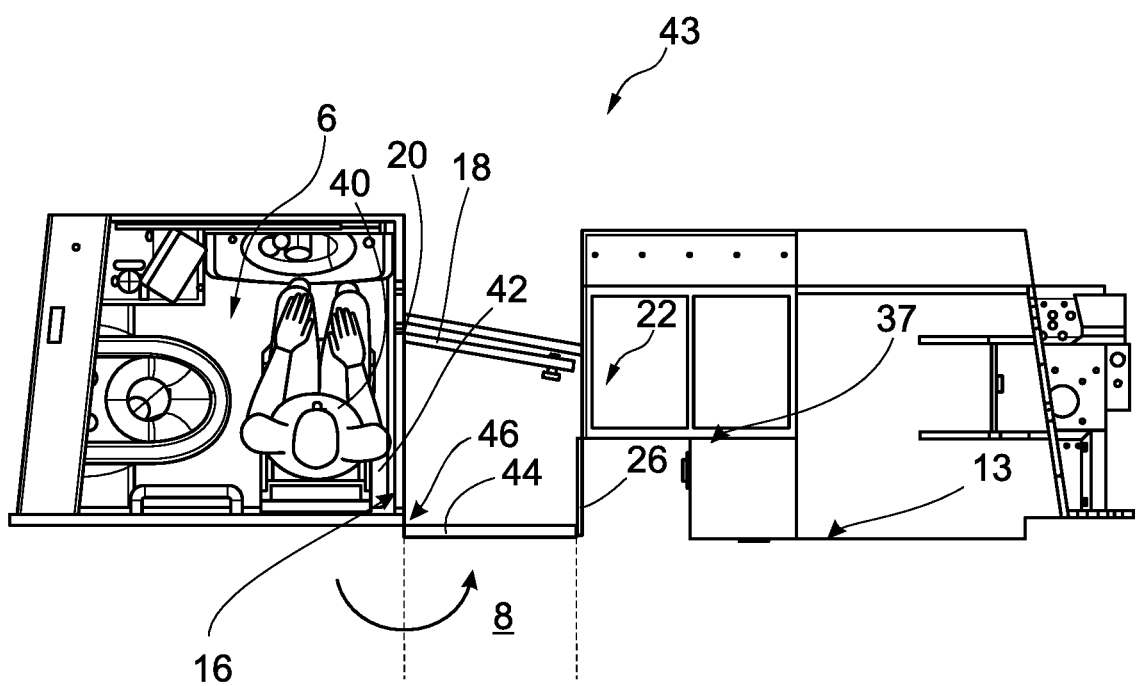
FIG. 4 shows a modification of FIG. 3 with an additional flap forming a privacy screen in front of the washroom.

FIG. 4 shows a monument arrangement 43, which corresponds to a modified monument arrangement 2 shown in FIG. 3. In FIG. 4, the first monument 4 has an additional flap 44 arranged on it, said flap being arranged for pivoting action about a pivot axis 46 on a side of the access opening 16 which is opposite the pivot axis 20 of the door 18. It is possible to use this flap 44, as required, to establish a connection with the second side wall portion 26, e.g. in the neutral position of the latter, in order to form a closed off area directly in front of the access opening 16, this area making it possible for a helper to help the person 40 in the wheelchair 42. As an alternative, it is conceivable to provide a kind of partition curtain or the like, which can be used to create such a privacy screen connection with the second side wall portion 26. It would also be conceivable for the door 18 to be arranged in a pivotable manner along the pivot axis 46, in which case it can perform the function of the flap 44.

Figure 5:
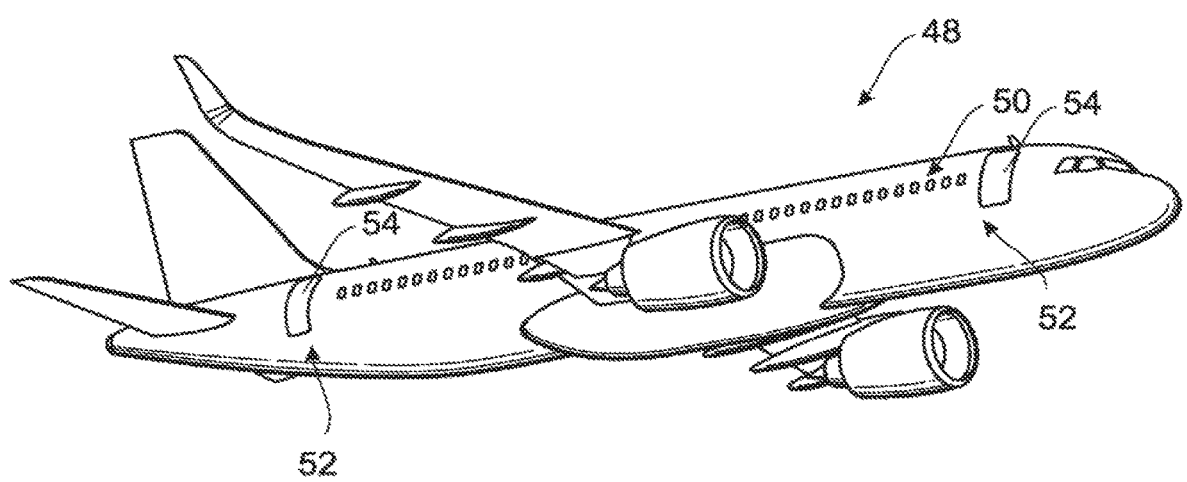
FIG. 5 shows an aircraft with a fuselage and a cabin, which is formed in the fuselage and in which such a monument arrangement is located.

FIG. 5 shows an aircraft 48 with a cabin 50 which is arranged therein and in which such a monument arrangement 2 or 43 is integrated. The latter may be adjacent, in particular, to a door region 52, i.e. an area in the cabin 50, which is located between two mutually opposite doors 54.

It should be noted, in addition, that "having" does not rule out other elements or steps, and the words "a" or "an" or "one" do not rule out a multiplicity. It should also be noted that features which have been described with reference to one of the above exemplary embodiments can also be used in combination with other features of other exemplary embodiments described above. Reference signs in the claims should not be considered to be restrictive.

The invention claimed is:

1. A monument arrangement for a cabin of a vehicle, the monument arrangement comprising:
   a first monument, with a washroom formed therein,
   a second monument and
   an aisle,
   wherein the first monument and the second monument enclose the aisle between them,
   wherein an access opening to the washroom in the first monument is directed toward a side wall which belongs to the second monument and is adjacent to the aisle,
   wherein the distance between the access opening of the washroom and the relevant side wall of the second monument is at most 1 m, and
   wherein the side wall of the second monument has a first, rigid side-wall portion and at least one second side-wall portion, which is mounted on the first side wall portion such that it can be pivoted about a vertical axis and which can be pivoted from a neutral position, running in the direction toward the first side wall portion, into an angled position, directed away from the first monument and the aisle.

2. The monument arrangement as claimed in claim 1, wherein the second monument is a kitchen monument, which has at least one storage location for a serving trolley, wherein the at least one storage location directly adjoins the relevant side wall on a side of the side wall which is directed away from the first monument.

3. The monument arrangement as claimed in claim 2, wherein the at least one storage location is delimited in the upward direction by a work surface which has a swing mounted work surface portion, which is directed toward the second side wall portion and can be swung, as required, between a use position and a release position,
   wherein the second side wall portion can be pivoted only in the release position of the work-surface portion and, in the use position of the work-surface portion, is blocked in the neutral position.

4. The monument arrangement as claimed in claim 1, wherein the second side wall portion has a pivoting action restrictor, which is intended to prevent the second side wall portion from pivoting closer to the first monument than the neutral position.

5. The monument arrangement as claimed in claim 1, wherein the height of the second side wall portion is at most 1.8 m.

6. The monument arrangement as claimed in claim 1, wherein at least one stowage compartment is arranged above the at least one storage location, wherein there is a depth direction offset between a stowage compartment front and a storage-location front.

7. The monument arrangement as claimed in claim 6, wherein the second side wall portion has a width which corresponds to the depth direction offset.

8. The monument arrangement as claimed in claim 1, wherein the second side wall portion can be arrested in its neutral position.

9. The monument arrangement as claimed in claim 1, wherein the second side wall portion extends along a main extent direction of the aisle by the same distance as a door which closes the access opening.

10. The monument arrangement as claimed in claim 1, wherein the vertical axis along which the second side wall portion is mounted in a pivotable manner is arranged directly opposite a door which closes the access opening.

11. The monument arrangement as claimed in claim 1, wherein the side wall of the second monument is configured such that an outer edge which belongs to the second monument and projects into the cabin is formed by a vertical edge which belongs to the second side wall portion and is directed away from the vertical axis.

12. A cabin for a vehicle, the cabin comprising at least one monument arrangement comprising:
    a first monument having a washroom formed therein;
    a second monument; and
    an aisle;
    wherein the first monument and the second monument enclose the aisle;
    wherein an access opening to the washroom in the first monument is directed toward a side wall of the second monument and is adjacent to the aisle;
    wherein a distance between the access opening of the washroom and a relevant side wall of the second monument is at most 1 meter; and
    wherein the side wall of the second monument has a first, rigid side wall portion and at least one second side-wall portion, which is mounted on the first side wall portion such that it can be pivoted about a vertical axis and which can be pivoted from a neutral position, running in the direction toward the first side wall portion, into an angled position, directed away from the first monument and the aisle.

13. An aircraft comprising:
    a cabin comprising at least one monument arrangement, each of the at least one monument arrangement comprising:
    a first monument having a washroom formed therein;
    a second monument; and
    an aisle;
    wherein the first monument and the second monument enclose the aisle;
    wherein an access opening to the washroom in the first monument is directed toward a side wall of the second monument and is adjacent to the aisle;
    wherein a distance between the access opening of the washroom and a relevant side wall of the second monument is at most 1 meter; and
    wherein the side wall of the second monument has a first, rigid side wall portion and at least one second side-wall portion, which is mounted on the first side wall portion such that it can be pivoted about a vertical axis and which can be pivoted from a neutral position, running in the direction toward the first side wall portion, into an angled position, directed away from the first monument and the aisle.

* * * * *